UNITED STATES PATENT OFFICE.

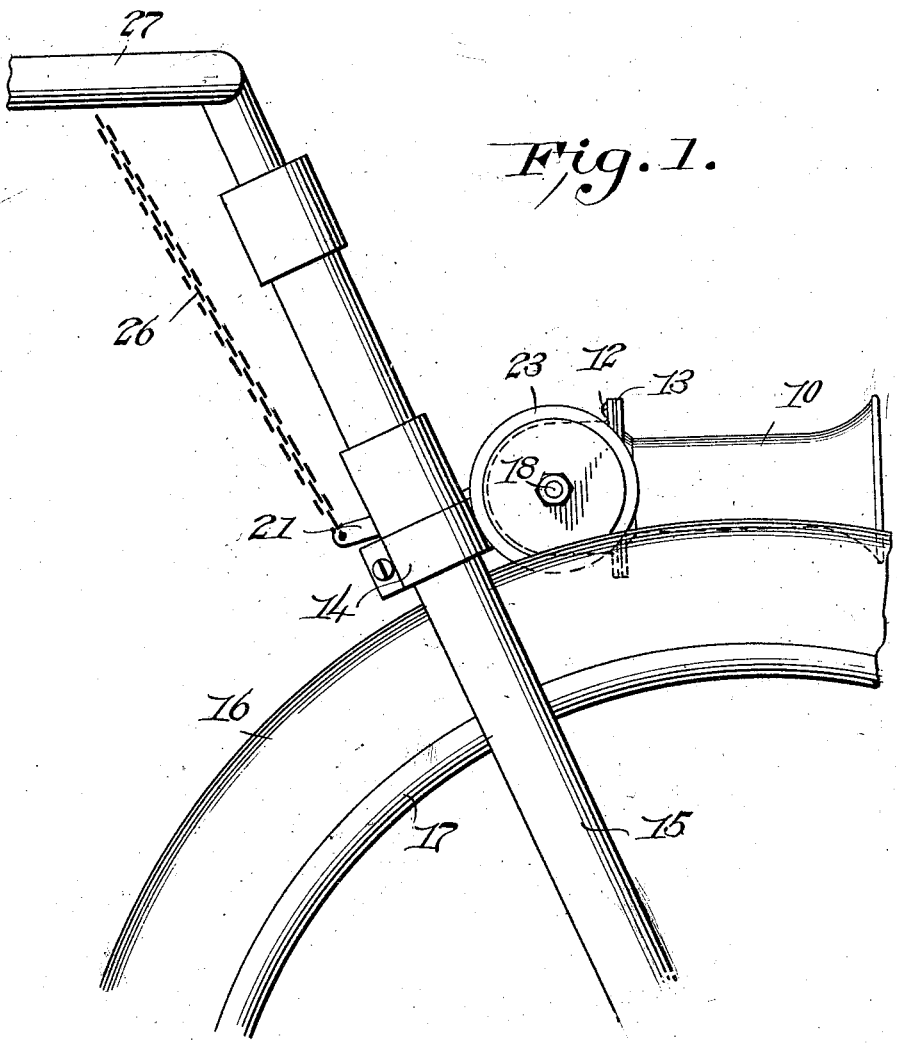

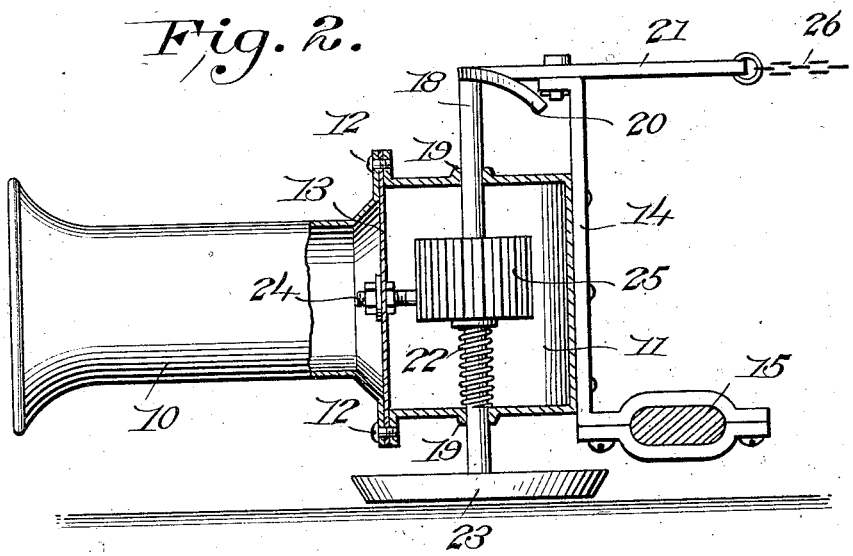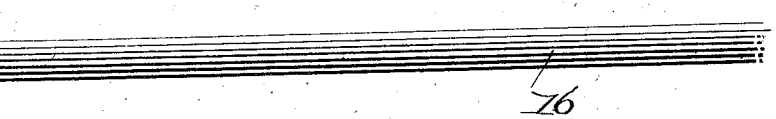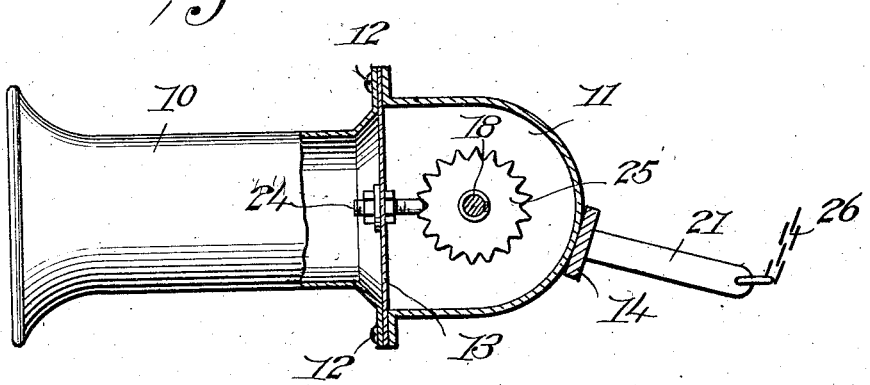

RALPH W. DUNKLE, OF GREENVILLE, OHIO.

SIGNAL-HORN.

1,140,968.

Specification of Letters Patent.

Patented May 25, 1915.

Application filed April 25, 1914. Serial No. 834,451.

*To all whom it may concern:*

Be it known that I, RALPH W. DUNKLE, a citizen of the United States, residing at Greenville, in the county of Darke and State of Ohio, have invented certain new and useful Improvements in Signal-Horns, of which the following is a specification.

This invention relates to an improved signal horn which is intended to be used in connection with bicycles, motorcycles and the like and the principal object of the invention is to provide a horn with improved means for moving the operating mechanism into and out of operative relation to the tire of one of the wheels.

Another object of the invention is to so mount the operating shaft that it will be normally held in an inoperative position and returned to the inoperative position when the actuating lever is released.

Another object of the invention is to so construct the actuating lever that the operating shaft of the horn may return the lever to its normal position when the actuating lever is released.

Another object of the invention is to provide a horn of the diaphragm type which will be compact and so constructed that the operating mechanism carried by the shaft will be inclosed and thus protected from damage by dirt or dampness.

This invention is illustrated in the accompanying drawings, wherein—

Figure 1 is a side elevation showing the horn applied to a bicycle; Fig. 2 is a top plan showing the horn partially in section and partially in top plan; and Fig. 3 is a view showing the horn partially in longitudinal section and partially in elevation.

The mouth piece 10 of the horn is secured to the housing 11 by means of screws 12 which pass through the diaphragm 13 and thus secure the diaphragm between the housing and mouth piece.

A bracket 14 is secured to the housing 11 and is connected with one of the front forks 15 of the bicycle so that the horn will be held close to the tire 16 of the front wheel 17.

The operating shaft 18 of this horn is slidably and rotatably mounted in bearings 19 and is held in engagement with the cam finger 20 of the lever 21 by means of a spring 22. It should be noted that the cam finger 20 is so shaped that pressure of the shaft 18 against the free end of the finger will tend to swing the lever to the position shown in the drawings and thus return the lever to its normal position and permit the shaft to move to an inoperative position. When the shaft 18 is in the inoperative position shown clearly in Fig. 2, the disk 23 will be held out of engagement with the tire 16 thus preventing the shaft from being rotated when not desired. The pin 24 carried by the diaphragm 13 engages the toothed disk 25 rigidly mounted upon the shaft 18 and it will thus be seen that when the shaft 18 is rotated that the diaphragm will be vibrated to cause a signal to be sounded. It should be noted that the toothed disk 25 is of such width that the shaft 18 may move to an operative position without the pin 24 moving out of engagement with the toothed disk.

Under normal circumstances the shaft 18 will be held in the position shown in Fig. 2 and the wheel 17 can therefore rotate without the horn being sounded. When it is desired to sound a signal the chain 26 which leads to a convenient place such as the handle bars 27 will be drawn to raise the lever 21 and swing the cam finger 20. As the cam finger 20 moves the shaft 18 will slide longitudinally through the housing 11 thus bringing the friction disk 23 into engagement with the tire 16. The shaft 18 will then be rotated thus causing the diaphragm 13 to be vibrated through the medium of the toothed disk 25 and pin 24 and giving out an audible signal. When it is no longer desired to sound the signal the chain or line 26 is released and the spring 22 will then move the shaft 18 to the position shown in Fig. 2 and move the disk 23 out of engagement with the tire 16. As the shaft 18 moves to the inoperative position the action of the shaft upon the cam finger 20 will cause the lever 21 to be returned to the longitudinal position thus leaving the signal in an inoperative position and again ready for use when desired. By having the spring and the toothed disk 25 inclosed in the housing 11 the spring is protected from the weather and prevented from being rusted by dampness and dust and dirt prevented from collecting upon the toothed disk 25 which would have a tendency to fill the spaces between the disk and thus prevent the signal from operating properly.

What is claimed is:—

1. A signal comprising a housing, a mouth piece, a diaphragm positioned between said housing and mouth piece, a pin carried by said diaphragm, an operating shaft slidably and rotatably carried by said housing, a toothed disk rigidly carried by said shaft and engaging said pin, a spring mounted upon said shaft between said disk and one of the walls of said housing for yieldably holding said shaft in a normal position, a disk secured to one end portion of said shaft outside said housing, a securing bracket carried by said housing, and a lever pivotally connected with said bracket and having one end portion formed into a cam finger engaging said shaft whereby said shaft may be moved to an operative position by movement of said lever and said shaft returned to said normal position by said spring, the shaft acting upon said cam finger to return said lever to its initial position when said shaft is returned to said normal position.

2. A signal comprising a housing, a vibratable element, an actuating shaft slidably and rotatably carried by said housing, means to transmit motion from said shaft to said vibratable element when said shaft is rotated, resilient means in said housing for yieldably holding said shaft in an inoperative position, means for causing said shaft to be rotated when said shaft is moved to an operative position, and means for moving said shaft to an operative position, said last mentioned means including a cam engaging said shaft to move said shaft longitudinally when said last mentioned means is moved, said shaft by engaging said cam returning said last mentioned means to its initial position when said shaft is moved to an inoperative position by said resilient means.

3. A signal comprising a housing, a diaphragm, a pin carried by said diaphragm, an operating shaft slidably and rotatably carried by said housing, actuating means for said pin, carried by said shaft, resilient means yieldably holding said shaft in a normally inoperative position, and a pivotally mounted lever having one end formed into a cam finger engaging said shaft whereby said shaft may be moved to an operative position by movement of said lever and said shaft returned to its normal position by said resilient means, the shaft acting upon said cam finger to return said lever to its initial position.

4. A signal comprising a housing, a vibratable element, an actuating shaft slidably and rotatably carried by said housing and provided with means to transmit motion to said vibratable element when said shaft is rotated, resilient means yieldably holding said shaft in an inoperative position, and means comprising a cam for moving said shaft longitudinally to an operative position, said shaft by engaging said cam returning said last mentioned means to its original position when said shaft is moved to an inoperative position by said resilient means.

5. A signal comprising a housing, a slidably and rotatably mounted operating shaft, means for yieldably holding said shaft in a normally inoperative position, means comprising a cam for moving said shaft longitudinally to an operative position, said shaft by engaging said cam returning said last mentioned means to its original position when said shaft is moved to an inoperative position by said first mentioned means, and sound producing means actuated by said shaft.

In testimony whereof I affix my signature in presence of two witnesses.

RALPH W. DUNKLE.

Witnesses:
S. P. DUNKLE,
H. F. DERSHEM.